Dec. 20, 1960  L. J. C. CONNELL  2,965,818
MANUFACTURE OF SEMICONDUCTOR RECTIFIER DEVICES
Filed April 2, 1958
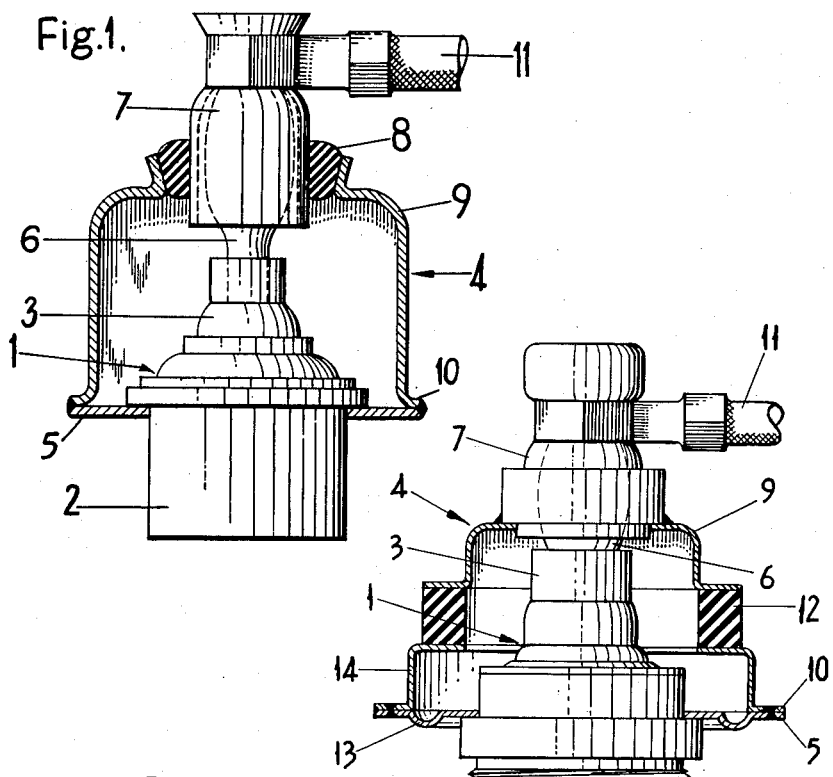
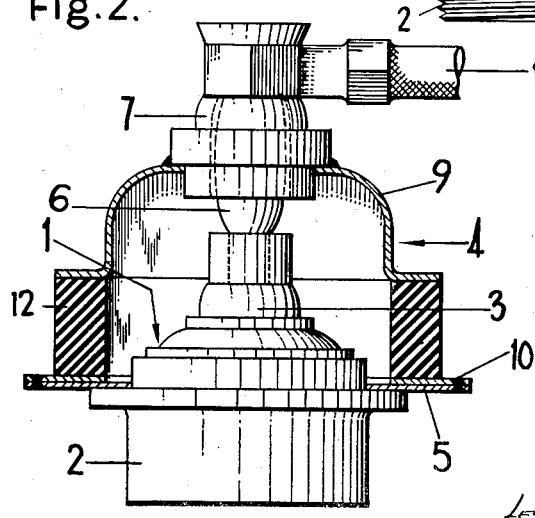
INVENTOR
LESLIE JAMES CAMBRIDGE CONNELL
BY
ATTORNEYS

United States Patent Office 2,965,818
Patented Dec. 20, 1960

2,965,818

MANUFACTURE OF SEMICONDUCTOR RECTIFIER DEVICES

Leslie James Cambridge Connell, Harrow Weald, England, assignor to The General Electric Company Limited, London, England Filed Apr. 2, 1958, Ser. No. 725,937

Claims priority, application Great Britain Apr. 3, 1957

7 Claims. (Cl. 317—234)

This invention relates to the manufacture of semiconductor rectifier devices, and is concerned particularly with semiconductor rectifier devices of the junction type including a rectifier element, a pair of opposing electrodes providing electrical connections to the element, and a hermetically sealed envelope enclosing the element. One object of the present invention is to provide an improved method of sealing the envelope of such a device.

According to the present invention, in a method of manufacturing a semiconductor rectifier device of the junction type including a rectifier element, a pair of opposing electrodes providing electrical connections to the element, and a hermetically sealed envelope enclosing the element, the envelope is sealed after the element is mounted therein by making a single joint between cooperating flanges of two flanged members associated respectively with the two electrodes, the flanged member associated with one of said electrodes comprising a terminal connected to this electrode by way of a flexible lead.

The joint may be made for example by resistance seam welding, or by ring welding, by argon arc welding or by cold welding. The terminal may comprise a thimble-like member which is crimped onto the flexible lead either before or after the welded joint is made.

The rectifier element may be of the kind having one terminal formed by a bead of indium and in this case an electrode may be bonded to this terminal by cold pressure welding.

Preferably, in order to provide an external electrical connection to the thimble-like terminal, a lead is crimped onto this terminal so as to extend radially therefrom.

Three semiconductor rectifier devices in accordance with the present invention will now be described by way of example with reference to the accompanying drawings in which Figure 1 is a sectional elevation of the first device, Figure 2 is a sectional elevation of the second device, and Figure 3 is a sectional elevation of the third device.

Referring to Figure 1 which illustrates the first device, the device comprises essentially a disc-shaped germanium rectifier element 1 suitably soldered by its lower face to an electrode 2 providing one electrical connection to the element, an electrode 3 suitably bonded to the upper face of the element so as to provide a second connection thereto, and a hermetically sealed envelope 4 enclosing the element. The electrode 2 is constituted by a hollow cylindrical copper block having a radially extending copper flange 5 brazed thereto, and the block is arranged to be cooled internally by cooling liquid. The electrode 3 is connected by way of a flexible lead 6 to a thimble-like member 7 of copper constituting one terminal of the device, the member 7 being crimped onto the upper end of the flexible lead. The member 7 is attached by means of a copper-glass seal 8 to a cup-shaped member 9 having a peripheral flange 10 which is cold welded to the radial flange 5. It will be seen that the rectifier element 1 is totally enclosed by the envelope 4.

An external electrical connection to the member 7 is made by crimping a lead 11 onto this member so that the lead is disposed radially with respect to the axis of the device.

In manufacturing the device, the flange 5 is brazed onto the block 2 and a semiconductor element in the form of a thin disc of germanium is soldered by its lower face onto this block. The rectifier element 1 is formed by applying to the upper face of the disc a slice of indium and heating in such a manner as to form a p–n junction and to leave on the upper face of the disc a bead of indium constituting a terminal for the element. This may be carried out in any suitable manner, such for example as that described in the complete specification accompanying copending patent application No. 651,402, filed April 8, 1957, for Semiconductor Devices.

The next step in the manufacture of the device is to attach to this terminal the electrode 3, the electrode having a flexible lead attached to it. A flat face of the electrode 3, to which face the terminal is to be attached, is coated with a layer of indium, and the electrode is subsequently attached to the terminal by cold pressure welding in the manner described in the provisional specification accompanying copending patent application No. 693,402, filed October 30, 1957, for Semiconductor Devices, the electrode being pressed into contact with the terminal under a relatively light pressure and rotated relatively thereto so as to effect a bond between the two indium surfaces.

In order to enclose the element 1, the upper portion of the envelope 4, comprising as a preassembled unit the flanged annular member 9 and the thimble-like copper terminal 7 bonded thereto by way of the glass insulating ring 8, is placed over the element 1 and the upper electrode 3 so that the flange 10 cooperates with the flange 5 on the lower electrode and so that the flexible lead 6 projects up into the terminal 7. The envelope is next sealed by joining the flanges 5 and 10 by cold pressure welding. The terminal 7 may be crimped onto the lead 6 either before or after the envelope is sealed.

The envelope may be provided with a pumping tube for the purpose of filling the envelope with an inert gas, or sealing of the envelope may be effected in a suitable inert atmosphere.

Referring now to Figure 2 which shows the second device, this device is somewhat similar to the first in its essential parts and comprises a rectifier element mounted upon an electrode 2 constituted by a hollow cylindrical block of copper, an electrode 3 providing a second electrical connection to the element 1, and envelope 4 comprising a cup-shaped Nicosel member 9 attached by way of an insulating ring 12 to a Nicosel flange 10, and a thimble-like terminal 7 which is connected by way of flexible lead 6 to the electrode 3. The flange 10 is seam welded to a Nicosel flange 5 brazed onto the electrode 2.

In this construction however, the member 9 is brazed directly into the terminal 7, the insulating ring 12 being disposed between the member and the flange 10. This ring is of an alumina ceramic known as "Sintox" and in order to bond it to the adjacent parts its end surfaces are first metallised and then plated with nickel. The member 9, the ring 12 and the flange 10 are assembled in a jig, brazing alloy being placed between adjacent faces, and the parts are brazed together in an atmosphere of dry hydrogen.

The method of manufacturing the device consists in brazing the Nicosel flange 5 onto the electrode 2, attaching to this electrode a disc of germanium and applying indium to the upper surface of the disc and heating so as to form a p-n junction, and attaching the upper electrode 3 to the element by means of cold pressure welding. The assembly comprising the terminal 7, the member 9, the insulating ring 12 and the flange 10 is next placed over the element so that the flanges 5 and 10 are in contact and so that the flexible lead 6 projects up into the terminal 7. Finally, the flanges 5 and 10 are joined by resistance seam welding, ring welding or by argon arc welding, and the terminal 7 is crimped onto the lead 6.

Referring now to Figure 3, the third device is similar in construction to the device illustrated in Figure 2, and comprises a rectifier element 1 mounted upon a hollow copper electrode 2, an electrode 3 providing a second electrical connection to the element, and envelope 4 comprising a cup-shaped Nicosel member 9 attached by way of an insulating ring 12 to a Nicosel flange 10, and a thimble-like terminal 7 which is connected by way of a flexible lead 6 to the electrode 3. The flange 5 is, however, of Nicosel, and is formed with an annular groove 13; the flange 10, which is formed with a vertical wall portion 14, is seam welded to this flange.

I claim:

1. A method of manufacturing a semiconductor device of the junction type including a rectifying element, a pair of opposing electrodes providing electrical connections to the element, and a hermetically sealed envelope enclosing the element, said method comprising the steps of providing a first electrode having a thin-sectioned radial flange, a second electrode having a flexible lead extending therefrom, and a cup-shaped member having a thimble-like terminal projecting therefrom, said member including a thin-sectioned peripheral flange at its mouth adapted to cooperate with said radial flange; attaching the rectifying element to said first electrode; attaching the second electrode to the rectifying element in opposition to the first electrode; then placing the cup-shaped member over the rectifying element while entering the free end of the flexible lead into the thimble-like terminal; and finally hermetically enclosing the element by welding said flanges together and also crimping the thimble-like terminal onto the free end of the flexible lead.

2. A method of manufacturing a semiconductor device as set forth in claim 1, wherein an external electrical connection is crimped onto said terminal so as to extend radially therefrom.

3. A method of manufacturing a semiconductor device as set forth in claim 1, the rectifier element being of the type having one terminal formed by a bead of indium, wherein the second electrode is attached to this terminal by cold pressure welding.

4. A semiconductor device of the junction type, comprising a first electrode having a thin-sectioned radial flange, a rectifier element attached to said first electrode, a cup-shaped member having a thimble-like terminal projecting therefrom and a thin-sectioned peripheral flange insulated from said terminal, said cup-shaped member covering the rectifier element and said peripheral flange cooperating with, and being welded to, said radial flange to form a hermetic enclosure for the rectifier element, a second electrode attached to the rectifier element and opposing said first electrode, and a flexible lead extending from said second electrode to said thimble-like terminal, said terminal being crimped onto the end of the lead.

5. A semiconductor device of the junction type, comprising a rectifier element, a first electrode secured to one face of said rectifier element, said first electrode consisting of a cylindrical metal block of high thermal conductivity, a thin-sectioned annular member secured to said first electrode and extending radially therefrom, said annular member being formed with a concentric annular groove, a second electrode secured to the other face of said rectifier element, a flexible lead extending from said second electrode, and a cup-shaped member having a thimble-like terminal projecting therefrom and a peripheral flange electrically insulated from said terminal, the terminal being crimped onto one end of the flexible lead, and said peripheral flange being welded to said annular member along a region between said annular groove and the outer rim of the annular member.

6. A semiconductor device of the junction type, comprising a rectifier element, a first electrode secured to one face of said rectifier element, said first electrode having a thin-sectioned radial flange, a second electrode secured to the other face of said rectifier element, a flexible lead extending from said second electrode, a thimble-like terminal crimped onto one end of the flexible lead, a pair of flanged annular metal members secured hermetically to said terminal and said radial flange respectively, and an annular ceramic member disposed between opposing flanges on said flanged annular metal members and secured hermetically thereto.

7. A semiconductor device of the junction type, comprising a rectifier element, a first electrode secured to one face of said rectifier element, said first electrode consisting of a cylindrical metal block of high thermal conductivity, a thin-sectioned annular member secured to said first electrode and constituting a radial flange thereto, said annular member being formed with a concentric annular groove, a second electrode secured to the other face of said rectifier element, a flexible lead extending from said second electrode, a thimble-like terminal crimped onto one end of the flexible lead, first and second flanged annular metal members secured hermetically to said terminal and to said radial flange respectively, and an annular ceramic member disposed between opposing flanges on said annular metal members and secured hermetically thereto, said second annular metal member having a peripheral flange welded to said radial flange along a region between the annular groove and the outer rim of the radial flange.

References Cited in the file of this patent

UNITED STATES PATENTS

| | | |
|---|---|---|
| 2,744,218 | Burton et al. | May 1, 1956 |
| 2,751,528 | Burton | June 19, 1956 |
| 2,790,940 | Prince | Apr. 30, 1957 |
| 2,794,942 | Cooper | June 4, 1957 |
| 2,806,187 | Boyer et al. | Sept. 10, 1957 |
| 2,827,597 | Lidow | Mar. 18, 1958 |
| 2,866,928 | Blundell | Dec. 30, 1958 |
| 2,889,498 | Boyer et al. | June 2, 1959 |